(12) United States Patent
Suga

(10) Patent No.: US 9,706,560 B2
(45) Date of Patent: Jul. 11, 2017

(54) BASE STATION DEVICE AND RADIO RESOURCE ALLOCATION METHOD

(71) Applicant: FUJITSU LIMITED, Kawasaki-shi, Kanagawa (JP)

(72) Inventor: Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 13/839,386

(22) Filed: Mar. 15, 2013

(65) Prior Publication Data
US 2013/0301469 A1    Nov. 14, 2013

(30) Foreign Application Priority Data

May 8, 2012    (JP) ................................. 2012-106707

(51) Int. Cl.
H04W 72/08    (2009.01)
H04W 28/22    (2009.01)
(Continued)

(52) U.S. Cl.
CPC ......... *H04W 72/085* (2013.01); *H04L 47/125* (2013.01); *H04W 28/0205* (2013.01);
(Continued)

(58) Field of Classification Search
None
See application file for complete search history.

(56) References Cited

U.S. PATENT DOCUMENTS

2009/0168701 A1*    7/2009    White ................. H04L 12/5692
                                                                370/328
2011/0158305 A1*    6/2011    Goransson ............ H04J 11/004
                                                                375/227
(Continued)

FOREIGN PATENT DOCUMENTS

JP    2009-141438 A    6/2009
JP    2010-171662 A    8/2010

OTHER PUBLICATIONS

Office Action of Japanese Patent Application No. 2012-106707 dated Feb. 9, 2016 with partial translation.
(Continued)

*Primary Examiner* — Charles C Jiang
*Assistant Examiner* — George Atkins, Jr.
(74) *Attorney, Agent, or Firm* — Arent Fox LLP

(57) ABSTRACT

A base station device including: a first radio interface configured to communicate with each of mobile station devices via a first link, a second radio interface configured to communicate with each of the mobile station devices via a second link, and a processor configured to set a first transmission rate of the first link and a second transmission rate of the second link, for each of the mobile station devices, to measure each of throughputs of each of communication flows between the base station device and each of the mobile station devices, to select a first communication flow which is transmitted via the first link, among the communication flows, based on the first transmission rate, the second transmission rate, and each of the throughput of the communication flows which are transmitted via the first link, and to set the first communication flow as to be transmitted via the second link.

15 Claims, 12 Drawing Sheets

(51) Int. Cl.
*H04W 28/02* (2009.01)
*H04W 28/08* (2009.01)
*H04L 12/803* (2013.01)
*H04W 88/10* (2009.01)

(52) U.S. Cl.
CPC .......... *H04W 28/08* (2013.01); *H04W 28/22* (2013.01); *H04W 88/10* (2013.01)

(56) References Cited

U.S. PATENT DOCUMENTS

| | | | | |
|---|---|---|---|---|
| 2011/0319072 | A1* | 12/2011 | Ekici | H04W 48/18 |
| | | | | 455/426.1 |
| 2012/0027112 | A1* | 2/2012 | Jiang | H04B 7/061 |
| | | | | 375/267 |
| 2013/0084863 | A1* | 4/2013 | Zhang | H04W 36/22 |
| | | | | 455/436 |
| 2013/0102313 | A1* | 4/2013 | Tinnakornsrisuphap | H04W 36/22 |
| | | | | 455/436 |
| 2014/0341109 | A1* | 11/2014 | Cartmell | H04L 45/308 |
| | | | | 370/328 |

OTHER PUBLICATIONS

IEEE Standard for Information technology—Telecommunications and information exchange between systems—Local and metropolitan area networks—Specific requirements. Part 3: Carrier Sense Multiple Access with Collision Detection (CSMA/CD) access method and Physical Layer Specifications, Jun. 22, 2010.

\* cited by examiner

FIG. 4

| RADIO LINK | RADIO RESOURCE USAGE RATE [%] |
|---|---|
| 5a | 97.5 |
| 5b | 48.3 |

FIG. 5

| MOBILE STATION | RADIO LINK | TRANSMISSION RATE [Mbps] |
|---|---|---|
| 3a | 5a | 24 |
| 3a | 5b | 12 |
| 3b | 5a | 24 |
| 3b | 5b | 18 |
| 3c | 5a | 36 |
| 3c | 5b | 2 |
| 3d | 5a | 12 |
| 3d | 5b | 36 |

FIG. 6

| MOBILE STATION | FLOW | THROUGHPUT [Mbps] |
|---|---|---|
| 3a | 6a1 | 3.6 |
| 3a | 6a2 | 0.6 |
| 3b | 6b1 | 1.2 |
| 3c | 6c1 | 14.4 |
| 3c | 6c2 | 9 |
| 3d | 6d1 | 1.3 |

FIG. 7A

| FLOW | RADIO LINK | LINK-USE RATIO |
|---|---|---|
| 6a1 | 5a | 1 |
| 6a2 | 5a | 1 |
| 6b1 | 5a | 1 |
| 6c1 | 5a | 1 |
| 6c2 | 5a | 1 |
| 6d1 | 5b | 1 |

FIG. 7B

| FLOW | RADIO LINK | LINK-USE RATIO |
|---|---|---|
| 6a1 | 5a,5b | 1:2 |
| 6a2 | 5a | 1 |
| 6b1 | 5a | 1 |
| 6c1 | 5a | 1 |
| 6c2 | 5a | 1 |
| 6d1 | 5b | 1 |

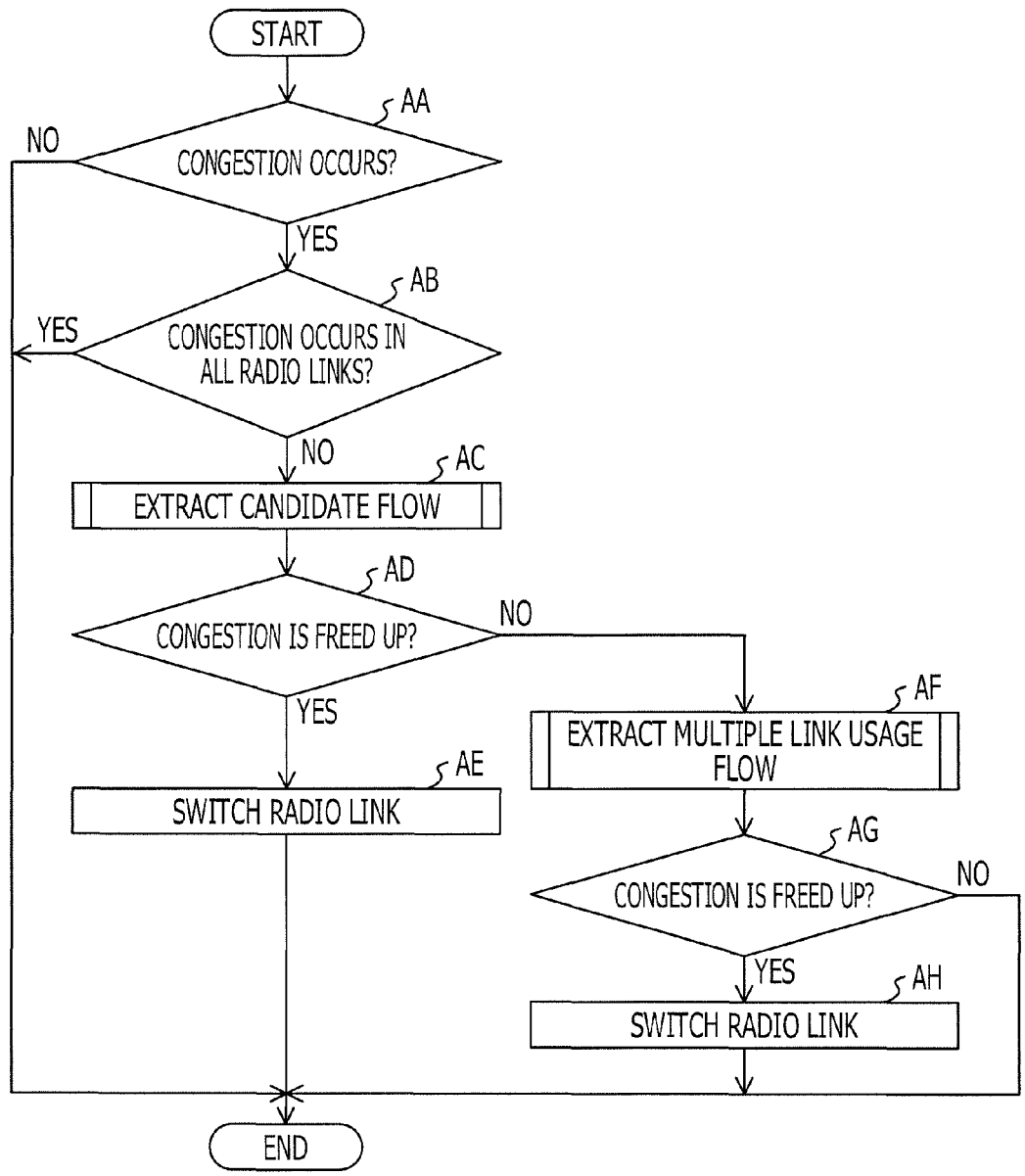

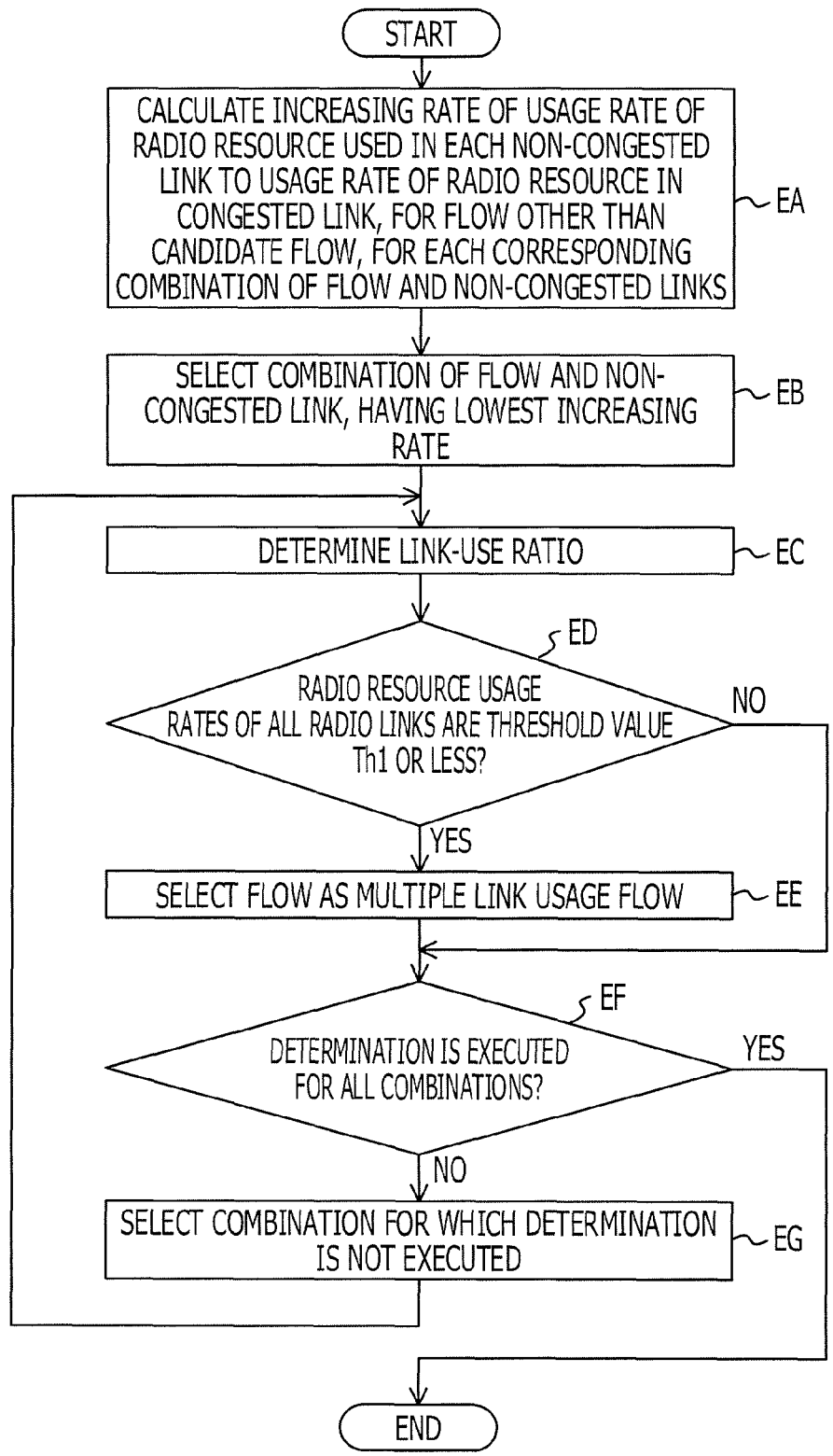

BASE STATION DEVICE AND RADIO RESOURCE ALLOCATION METHOD

CROSS-REFERENCE TO RELATED APPLICATION

This application is based upon and claims the benefit of priority from the prior Japanese Patent Application No. 2012-106707 filed on May 8, 2012, the entire contents of which are incorporated herein by reference.

FIELD

The embodiments discussed herein are related to a base station device that is used for mobile communication and an allocation method of radio resources.

BACKGROUND

As an example of radio devices employing a technology that uses a plurality of radio links, a radio device is known that includes a plurality of radio modules that transmits allocated packets and a path switching unit that switches a path through which the radio modules transmit packets when a communication quality falls below a reference value.

In addition, a data communication system is known that executes data communication from a first communication device to a second communication device through a plurality of communication paths. The data communication system includes a plurality of communication interfaces that are installed in the first communication device and used to couple the data communication system to the plurality of communication paths, and a data distribution unit that is installed in the first communication device and distributes transmission data to the plurality of communication interfaces based on a transmission capacity of each of the communication paths.

In addition, as a technology that is employed in data communications using a plurality of links, link aggregation of the Ethernet (registered trademark) is known.

Japanese Laid-open Patent Publication Nos. 2009-225126 and 2004-96247 are examples of the related arts.

In addition, there is also an example of the related art that is discussed in IEEE Standard for Information technology-Telecommunication and information exchange between systems-Local and metropolitan area networks-Specific requirements Part 3: "Carrier Sense Multiple Access with Collision Detection (CSMA/CD) access method and Physical Layer specifications", Jun. 22, 2010.

SUMMARY

According to an aspect of the invention, a base station device including: a first antenna configured to communicate with each of mobile station devices via a first radio link, a second antenna configured to communicate with each of the mobile station devices via a second radio link, and a processor configured to set a first transmission rate of the first radio link and a second transmission rate of the second radio link, for each of the mobile station devices, to measure each of throughputs of each of communication flows between the base station device and each of the mobile station devices, to select a first communication flow which is transmitted via the first radio link, from the communication flows, based on the first transmission rate, the second transmission rate, and each of the throughput of the communication flows which are transmitted via the first radio link, and to set the first communication flow as to be transmitted via the second radio link.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of resource usage data;

FIG. 5 is a diagram illustrating an example of transmission rate data;

FIG. 6 is a diagram illustrating an example of throughput data;

FIGS. 7A and 7B are diagrams illustrating a first example and a second example of allocation data;

FIG. 8 is a diagram illustrating of a radio link switching process;

FIG. 12 is a diagram illustrating a second example of the process for extracting a flow that includes multiple links.

DESCRIPTION OF EMBODIMENTS

When a base station device is coupled to mobile station devices through radio links, communication qualities or transmission rates in the plurality of radio links may be different among the mobile station devices. Thus, when the base station device is coupled to the mobile station devices through the radio links, a desirable radio link out of a plurality of radio links is different depending on the mobile station device. Therefore, not all radio links are efficiently used. A device and a method that are discussed herein improve efficiency of radio links coupling a base station device with mobile station devices.

1. First Embodiment

1. 1. Overall Configuration of a Communication System

Figure 1:
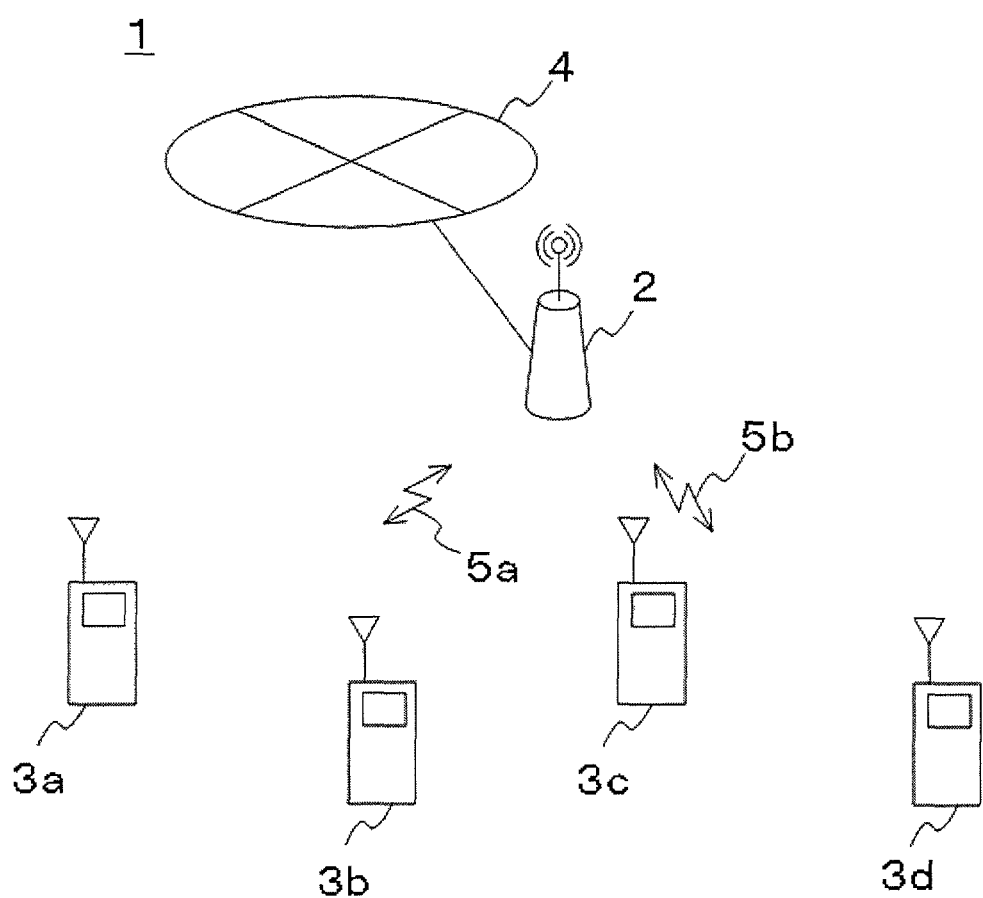
FIG. 1 is a diagram illustrating an overall configuration example of a communication system.

The embodiments are described below with reference to accompanying drawings. FIG. 1 is a diagram illustrating an overall configuration example of a communication system. A communication system 1 includes a base station device 2, mobile station devices 3a to 3d, and a wired network 4. The following description and drawings, a mobile station device, a base station device, and a network, may be respectively referred to as a "mobile station", "base station", and "NW". In addition, the mobile stations 3a to 3d may be collectively referred to as "mobile stations 3".

The base station 2 relays communication between the mobile stations 3 and the NW 4. Communication between the base station 2 and each of the mobile stations 3 is executed through a plurality of radio links such as 5a and 5b. The plurality of radio links such as 5a and 5b, may be, for example, that of a radio access network that adheres to different radio communication standards. For example, the radio link 5a may be that of a radio access network that adheres to any one of International Mobile Telecommunication (IMT)-2000, Long Term Evolution (LTE), Worldwide Interoperability for Microwave Access (WiMAX), and wireless fidelity (Wi-Fi). The radio link 5b may be a radio link of a radio access network that adheres to a standard other than the standard that is adhered to by the radio link 5a.

In addition, the base station 2 transmits and receives data to and from another base station and a higher-level device, through the NW 4. In the following description, it is assumed that the base station 2 is a femto base station having relatively small coverage. However, this example does not intend that a base station and a switching process of a radio link that are described below are applied merely to the femto base station. The base station that is described in the present specification may be a macro base station and another type of a base station.

1. 2. Hardware Configuration of the Base Station

Figure 2:
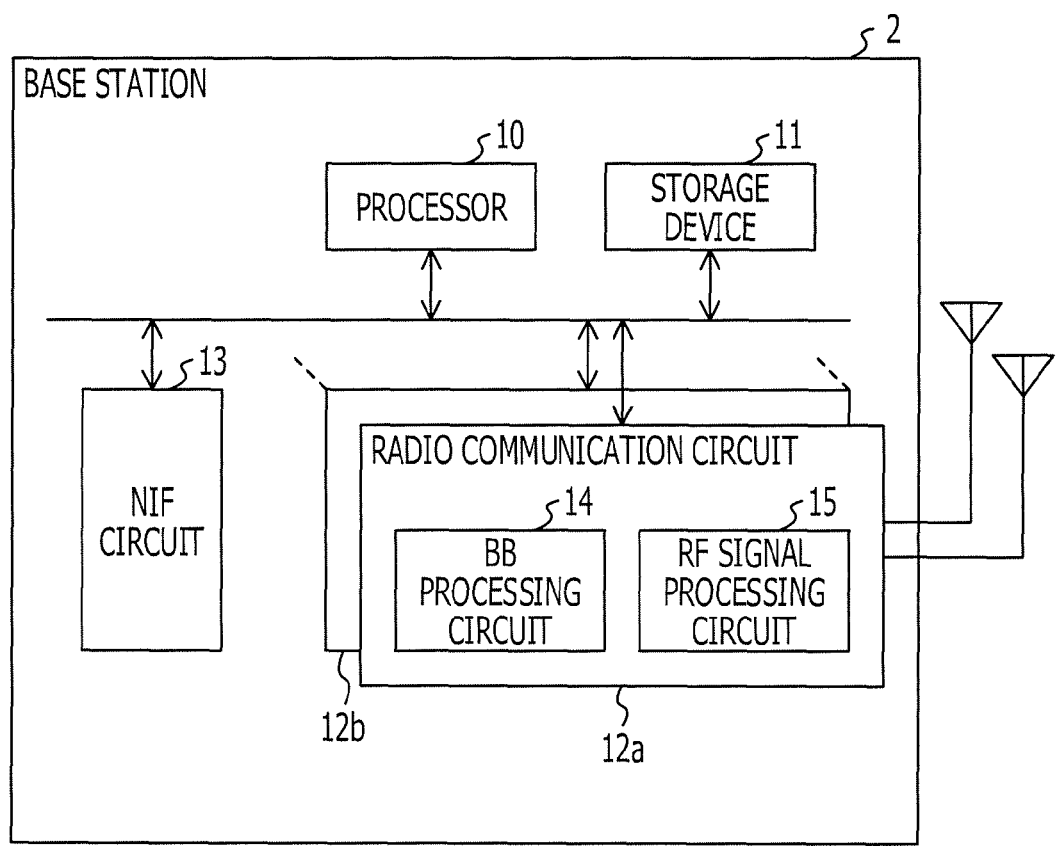
FIG. 2 is a diagram illustrating an example of a hardware configuration of a base station.

A configuration of the base station 2 is described below. FIG. 2 is a diagram illustrating an example of a hardware configuration of the base station 2. The base station 2 includes a processor 10, a storage device 11, a plurality of radio communication circuits such as 12a and 12b, and a network interface circuit 13. Each of the radio communication circuits such as 12a and 12b, includes a baseband processing circuit 14 and a radio frequency signal processing circuit 15. In the following description and accompanying drawings, a baseband, a radio frequency, and a network interface may be respectively referred to as "BB", "RF", and "NIF". The radio communication circuits such as 12a and 12b may be collectively referred to as "radio communication circuits 12".

The processor 10 executes user management processing and process control of the base station 2, other than processing that is described below and is executed by the BB processing circuit 14. In the storage device 11, a control program for information processing by the processor 10 is stored. In addition, data, which are used during execution of the corresponding program, and temporary data are also stored in the storage device 11.

Each of the radio communication circuits such as 12a and 12b executes signal processing of radio communication through the plurality of radio links such as 5a and 5b. For example, the radio communication circuit 12a may execute the signal processing of the radio communication by the radio link 5a, and the radio communication circuit 12b may execute the signal processing of the radio communication by the radio link 5b. The BB processing circuit 14 executes coding and modulation, and demodulation and decoding of a signal that is transmitted and received between the mobile station 3 and the base station 2 and executes communication protocol processing and processing of a BB signal that is related to scheduling.

The BB processing circuit 14 may include a processor for signal processing and a memory for storing a program and data used by the processor. The processor may be, for example, a digital signal processor (DSP) or a central processing unit (CPU). In addition, the BB processing circuit 14 may include a logic circuit such as a large scale integration (LSI), an application specific integrated circuit (ASIC), and a field-programming gate array (FPGA) for signal processing.

The RF signal processing circuit 15 executes digital to analogue conversion, analogue to digital conversion, frequency conversion, signal amplification, and filtering of a radio signal that is transmitted and received between the mobile station 3 and the base station 2. An NIF circuit 13 executes signal processing to transmit and receive of a signal to and from another base station and a higher-level device through the NW 4.

The hardware configuration that is illustrated in FIG. 2 is a mere example to describe the embodiments. As long as the processes that are described later are executed, the communication system that is described in this specification may employ any hardware configuration.

1. 3. Function Configuration of the Base Station

Figure 3:
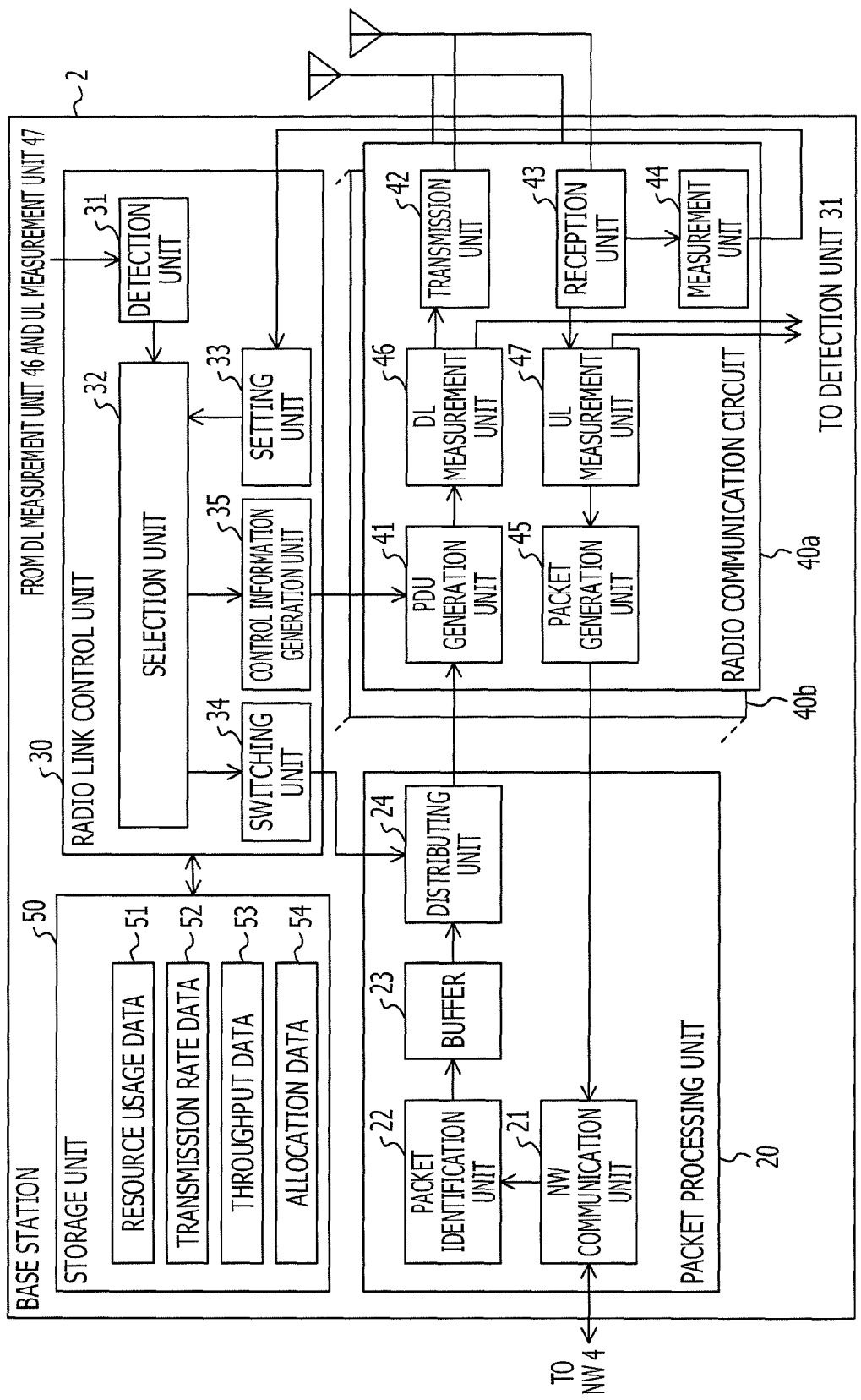
FIG. 3 is a diagram illustrating an example of a function configuration of the base station.

FIG. 3 is a diagram illustrating an example of a function configuration of the base station 2. The base station 2 includes a packet processing unit 20, a radio link control unit 30, radio communication units such as 40a and 40b, and a storage unit 50. In the following description, the radio communication units such as 40a and 40b may be collectively referred to as "radio communication units 40". The radio communication unit 40 is provided for each of the radio links 5, and the radio communication units such as 40a and 40b are provided so as to respectively correspond to the radio links such as 5a and 5b.

The packet processing unit 20 transmits and receives a packet to and from the NW 4 and executes processing of a received packet from the NW 4. The packet processing unit 20 includes an NW communication unit 21, a packet identification unit 22, a buffer 23, and a distributing unit 24. The NW communication unit 21 is an interface between the NW 4 and the base station 2, and transmits and receives a packet to and from the NW 4.

The packet identification unit 22 receives a packet from the NW 4 and identifies the flow through which the packet arrives. The packet identification unit 22 classifies the packet into each flow and stores the packet in the buffer 23. In accordance with designation of a radio link, which is output from the switching unit 34 as described later, the distributing unit 24 transfers the packets for each of the flows, which are stored in the buffer 23, to a radio processing unit 40 that corresponds to the designated radio link.

The radio link control unit 30 controls allocation of a radio link that is used for the flow in each of the mobile stations 3. The radio link control unit 30 includes a detection unit 31, a selection unit 32, a setting unit 33, a switching unit 34, and a control information generation unit 35.

The detection unit 31 detects the occurrence of congestion in the radio link 5. For example, the detection unit 31 may obtain information on radio resource usage rates in downlink and uplink from a downlink measurement unit 46 and an uplink measurement unit 47 that are described later, and determine the occurrence of congestion when the radio resource usage rates are a threshold value Th1 or more. The detection unit 31 stores resource usage data 51 that indicates information on the obtained radio resource usage rates, in the storage unit 50. In the following description and accompanying drawings, downlink and uplink may be respectively referred to as "DL" and "UL".

FIG. 4 is a diagram illustrating an example of the resource usage data 51. The example illustrates radio resource usage rates of the radio links 5a and 5b in DL. The resource usage data 51 includes information elements "radio link" and "radio resource usage rate". The information element "radio link" indicates an identifier of each of the radio links, and the information element "radio resource usage rate" indicates a usage rate of radio resource that is currently being used in each of the radio links. The example of FIG. 4 indicates that a radio resource usage rate of the radio link 5a in DL is 97.5% and a radio resource usage rate of the radio link 5b in DL is 48.3%.

In FIG. 3, the selection unit 32 selects a radio link for the flow in each of the mobile stations 3. The selection unit 32 obtains information on a nominal transmission rate that is defined by a modulation and coding scheme (MCS) of each of the radio links 5 between the base station 2 and each of the mobile stations 3, from the setting unit 33 that is described later. In the following description, the nominal transmission rate is simply referred to as a "transmission rate". The selection unit 32 may store transmission rate data 52 that indicates information on an obtained transmission rate in the storage unit 50.

FIG. 5 is a diagram illustrating an example of the transmission rate data 52. The transmission rate data 52 includes information elements of a "mobile station", a "radio link", and a "transmission rate". The information element "mobile station" indicates an identifier of the mobile station 3, and the information element "radio link" indicates an identifier of each of the radio links. The information element "transmission rate" indicates a transmission rate in each of the radio links of each of the mobile stations 3. For example, data of the first line in the example of FIG. 5 indicates that a transmission rate in the radio link 5a of the mobile station 3a is 24 Mbps, and data of the fourth line in the example of FIG. 5 indicates that a transmission rate in the radio link 5b of the mobile station 3b is 16 Mbps.

In FIG. 3, the selection unit 32 obtains throughput information of each of the flows from a DL measurement unit 46 and a UL measurement unit 47. The selection unit 32 may store throughput data 53 that indicates the obtained throughput information in the storage unit 50. FIG. 6 is a diagram illustrating an example of the throughput data 53.

The example illustrates a throughput of each flow of each of the mobile stations 3a to 3d in DL. In addition, it is assumed that there exists flows 6a1 and 6a2 of the mobile station 3a, there exist a flow 6b1 of the mobile station 3b, there exists flows 6c1 and 6c2 of the mobile station 3c, and there exists a flow 6d1 of the mobile station 3d.

The transmission rate data 52 includes information elements "mobile station", "flow", and "throughput". The information element "mobile station" indicates an identifier of the mobile station 3, and the information element "flow" indicates an identifier of each of the flows. The information element "throughput" indicates a throughput of each of the flows. For example, data of the first line in the example of FIG. 6 indicates that a throughput in the flow 6a1 of the mobile station 3a is 3.6 Mbps, and data of the fifth line in the example of FIG. 6 indicates that a throughput in the flow 6c2 of the mobile station 3c is 9 Mbps.

In FIG. 3, the selection unit 32 selects the radio link 5 that is allocated to the flow of the mobile station 3 based on the resource usage data 51, the transmission rate data 52, and the throughput data 53. A selection process of a radio link by the selection unit 32 is described in "1. 4. Radio link switching process" that is described later.

The setting unit 33 sets a transmission rate of each of the mobile stations 3 depending on radio states in DL and UL between the base station 2 and the mobile station 3. For example, the setting unit 33 sets a transmission rate in DL based on a channel quality identifier (CQI) that indicates a channel quality that is measured in the mobile station 3. In addition, the setting unit 33 sets a transmission rate in UL based on reception strength of a reference signal in UL.

The switching unit 34 switches the radio link 5 that is used for each of the flows based on the allocation result of the selection unit 32. The switching unit 34 notifies the distributing unit 24 of designation of the used link in each of the flows. The switching unit 34 may store allocation data 54 that indicates the allocation result by the selection unit 32 in the storage unit 50.

FIGS. 7A and 7B are diagrams illustrating a first example and a second example of the allocation data 54. The allocation data 54 includes information elements "flow", "radio link", and "link-use ratio". The information element "flow" indicates an identifier of each of the flows, and the information element "radio link" indicates an identifier of the radio link 5 that is allocated to each of the flows. For example, data of the first line in the example of FIG. 7A indicates that the radio link 5a is allocated to the flow 6a1. In addition, data of the sixth line in the example of FIG. 7A indicates that the radio link 5b is allocated to the flow 6d1.

The selection unit 32 may allocate a plurality of radio links 5 as the radio links 5 that are used by one flow at the same time. The information element "link-use ratio" determines a use ratio at which the flow that uses the plurality of radio links 5 at the same time uses the allocated plurality of radio links 5. The link-use ratio may be, for example, a ratio of traffic that is transmitted through the plurality of radio links 5. For example, data of the first line in the example of FIG. 7B indicates that the radio links 5a and 5b are allocated to the flow 6a1. The information element "link-use ratio" indicates that a ratio at which the flow 6a1 uses the radio links 5a and 5b is 1:2.

In FIG. 3, the distributing unit 24 transfers packets for each of the flows, to the radio processing unit 40 in accordance with the allocation of the radio links 5, which is indicated in the allocation data 54. When a plurality of radio links 5 are allocated to one flow, the distributing unit 24 determines an amount of packets that are transferred to the radio processing unit 40 that corresponds to each of the radio links, based on the link-use ratio. For example, the distributing unit 24 may affect a ratio of the number of packets that are transferred to each of the radio processing units 40, to correspond to the link-use ratio, and may affect a ratio of data amounts to correspond to the link-use ratio.

A control information generation unit 35 generates control information that is transmitted to the mobile station 3 and supplies the control information to a protocol data unit generation unit 41. In the following description and accompanying drawings, a protocol data unit may be referred to as "PDU".

Each of the radio communication units 40 executes the signal processing of radio communication between the base station 2 and the mobile station 3 through the radio link 5. For example, the radio communication unit 40a may execute the signal processing of radio communication through the radio link 5a, and the radio communication unit 40b may execute the signal processing of radio communication through the radio link 5b. The radio communication unit 40 includes the PDU generation unit 41, a transmission unit 42, a reception unit 43, a measurement unit 44, a packet generation unit 45, the DL measurement unit 46, and the UL measurement unit 47.

The PDU generation unit 41 converts a packet that is transferred from the distributing unit 24 into data unit that is allowed to be transferred through the radio communication. In addition, the PDU generation unit 41 converts a control signal that is supplied from the control information generation unit 35 into data unit that is allowed to be transferred through the radio communication. The transmission unit 42 executes coding and modulation for the data that is generated in the PDU generation unit 41 to generate a radio signal.

The reception unit 43 receives a radio signal from the mobile station 3, executes demodulation and decoding for the radio signal to restore the data, and transfers the restored data to the packet generation unit 45. In addition, the reception unit 43 transfers a CQI that is transmitted from the mobile station 3, to the measurement unit 44. In addition, the reception unit 43 transfers a reference signal included in an uplink signal to the measurement unit 44. The measurement unit 44 measures radio states in DL and UL based on the CQI and the reference signal, and transmits the radio state to the setting unit 33.

The packet generation unit 45 restores data that is received from the mobile station 3 into a packet and transfers the restored packet to the NW communication unit 21. The DL measurement unit 46 monitors data to be transmitted from the base station 2 to the mobile station 3 and measures a usage rate of a radio resource and a throughput of each of the flows in DL. The UL measurement unit 47 monitors data to be transmitted from the mobile station 3 to the base station 2 and measures a usage rate of a radio resource and a throughput of each of the flows in UL.

The above-described processes of the packet processing unit 20, the radio link control unit 30 and the PDU generation unit 41, the packet generation unit 45, the DL measurement unit 46, and the UL measurement unit 47 are executed by the processor 10 illustrated in FIG. 2. The above-described processes of the transmission unit 42, the reception unit 43, and the measurement unit 44 are executed by the radio communication circuit 12 illustrated in FIG. 2. A storage area of the storage unit 50 is provided in the storage device 11 illustrated in FIG. 2.

In addition, in the function configuration diagram in FIG. 3, a configuration that is related to the function of the base station 2 that is described in the present specification is mainly illustrated. The base station 2 may include another configuration element other than the illustrated configuration elements.

1. 4. Radio Link Switching Process

The switching process of a radio link by the base station 2 is described below with reference to FIG. 8. A series of processes that are described below with reference to FIG. 8 may be interpreted as a method including a plurality of procedures. In this case, "Operation" may be regarded as "Step". In addition, in processes that are described in FIGS. 9 to 12, "Operation" may be regarded as "Step", similar to the process that is described in FIG. 8.

In Operation AA, the detection unit 31 detects occurrence of congestion in the radio link 5. When the congestion occurs (Operation AA: Yes), the process proceeds to Operation AB. When the congestion does not occur (Operation AA: No), the process ends. In Operation AB, the selection unit 32 determines whether or not the congestion occurs in all of the radio links 5.

When the congestion occurs in all of the radio links 5 (Operation AB: Yes), the selection unit 32 ends the switching process without switching the radio link. This is why there is less chance in which the congestion is freed up even when the used link in each of the flows is switched when all of the radio links 5 are in a congestion state. When the congestion occurs in not all of the radio links 5 (Operation AB: No), the process proceeds to Operation AC.

In Operation AC, the selection unit 32 extracts a candidate of a flow in which allocation of the radio link 5 is switched. In the following description, the candidate of the flow in which the allocation of the radio link 5 is switched may be referred to as a "candidate flow". In addition, the selection unit 32 determines a new radio link 5 that is allocated to the candidate flow. The extraction process of the candidate flow is described later with reference to FIG. 9.

In Operation AD, the selection unit 32 determines whether or not the congestion is freed up by switching the allocation of the radio link 5 to the candidate flow that is selected in Operation AC. When the congestion is freed up (Operation AD: Yes), the process proceeds to Operation AE. When the congestion is not freed up (Operation AD: No), the process proceeds to Operation AF. In Operation AE, the switching unit 34 switches the radio link 5 that is used for the candidate flow. After that the switching process ends.

In Operation AF, the selection unit 32 extracts a flow that uses a plurality of radio links 5 at the same time from flows other than a candidate flow that uses the radio link 5 that is in the congestion state. In the following description, the flow that uses a plurality of radio links 5 at the same time may be referred to as a "multiple link usage flow". The selection unit 32 determines a plurality of radio links 5 that are used for a multiple link usage flow, and the link-use ratio. The extraction process of the multiple link usage flow is described later with reference to FIG. 10.

In Operation AG, the selection unit 32 switches allocation of the radio link 5 to the candidate flow and determines whether or not the congestion is freed up as a result of setting the multiple link usage flow using the plurality of radio links 5. When the congestion is freed up (Operation AG: Yes), the process proceeds to Operation AH. When the congestion is not freed up (Operation AG: No), the selection unit 32 ends the switching process without switching the radio link.

In Operation AH, the switching unit 34 switches the radio link 5 that is used for the candidate flow. In addition, the switching unit 34 switches the used link of the multiple link usage flow to the plurality of radio links 5 that are determined in Operation AF. After that, the switching process ends.

A process for extracting a candidate flow by the selection unit 32 is described below. The switching process of the radio link 5 in DL is described below as an example, and the switching process of the radio link 5 in UL may be similar to that in the switching process of the radio link 5 in DL. In addition, in the description of the first embodiment, it is assumed that at the time of congestion base station 2 uses radio link 5, comprised of the two radio links 5a and 5b, and that the congestion occurs in the radio link 5a and the congestion does not occur in the radio link 5b.

When the candidate flow is extracted, the selection unit 32 identifies a flow that transmits traffic through the radio link 5a. The selection unit 32 determines whether or not the used link of the identified flow is switched from the radio link 5a in which the congestion occurs, to the radio link 5b in which the congestion does not occur. At this time, the selection unit 32 determines whether or not the radio link of the flow is switched, based on a throughput of the flow and transmission rates in the radio link 5a and the radio link 5b of the mobile station 3 that receives the flow.

At that time, the selection unit 32 compares use efficiency of a radio resource when the mobile station 3 that receives the flow uses the radio link 5a, with use efficiency of a radio resource when the mobile station 3 uses the radio link 5b. The selection unit 32 preferentially switches the used link from the radio link 5a to the radio link 5b, for a flow having a high ratio of the use efficiency in the radio link 5b to the use efficiency in the radio link 5a. By switching the radio link based on such priority, use efficiency of radio resources in the whole system is improved, and occupancy rates of the radio resources are reduced, so that the congestion is more easily freed up.

For example, the selection unit 32 determines a ratio of a usage rate of a radio resource in the radio link 5b, which is used by the flow, to a usage rate of a radio resource in the radio link 5a, which is used by the flow. The ratio indicates an increase rate of a radio resource usage rate when the used link of the flow is switched from the radio link 5a to the radio link 5b. The selection unit 32 preferentially switches the used link from the radio link 5a to the radio link 5b for a flow having a lower increase rate.

For example, in the example of FIG. 5 and FIG. 6, a throughput of the flow 6a1 in the mobile station 3a is 3.6 Mbps, and transmission rates of the mobile station 3a in the radio links 5a and 5b are 24 Mbps and 12 Mbps, respectively. Thus, radio resource usage rates of the flow 6a1 in the radio links 5a and 5b are "3.6/24=15%" and "3.6/12=30%", respectively, so that the increase rate is "30/15=2".

On the other hand, a throughput of the flow 6c2 in the mobile station 3c is 9 Mbps, and transmission rates of the mobile station 3a in the radio links 5a and 5b are 36 Mbps and 2 Mbps, respectively. Thus, radio resource usage rates of the flow 6c2 in the radio links 5a and 5b are "9/36=25%" and "9/2=450%", respectively, so that the increase rate is "450/25=18". As a result, the increase rate "2" of the flow 6a1 is lower than the increase rate "18" of the flow 6c2, so that the selection unit 32 preferentially switches the used link for the flow 6a1 as compared with the switching for the flow 6c2.

Figure 9:
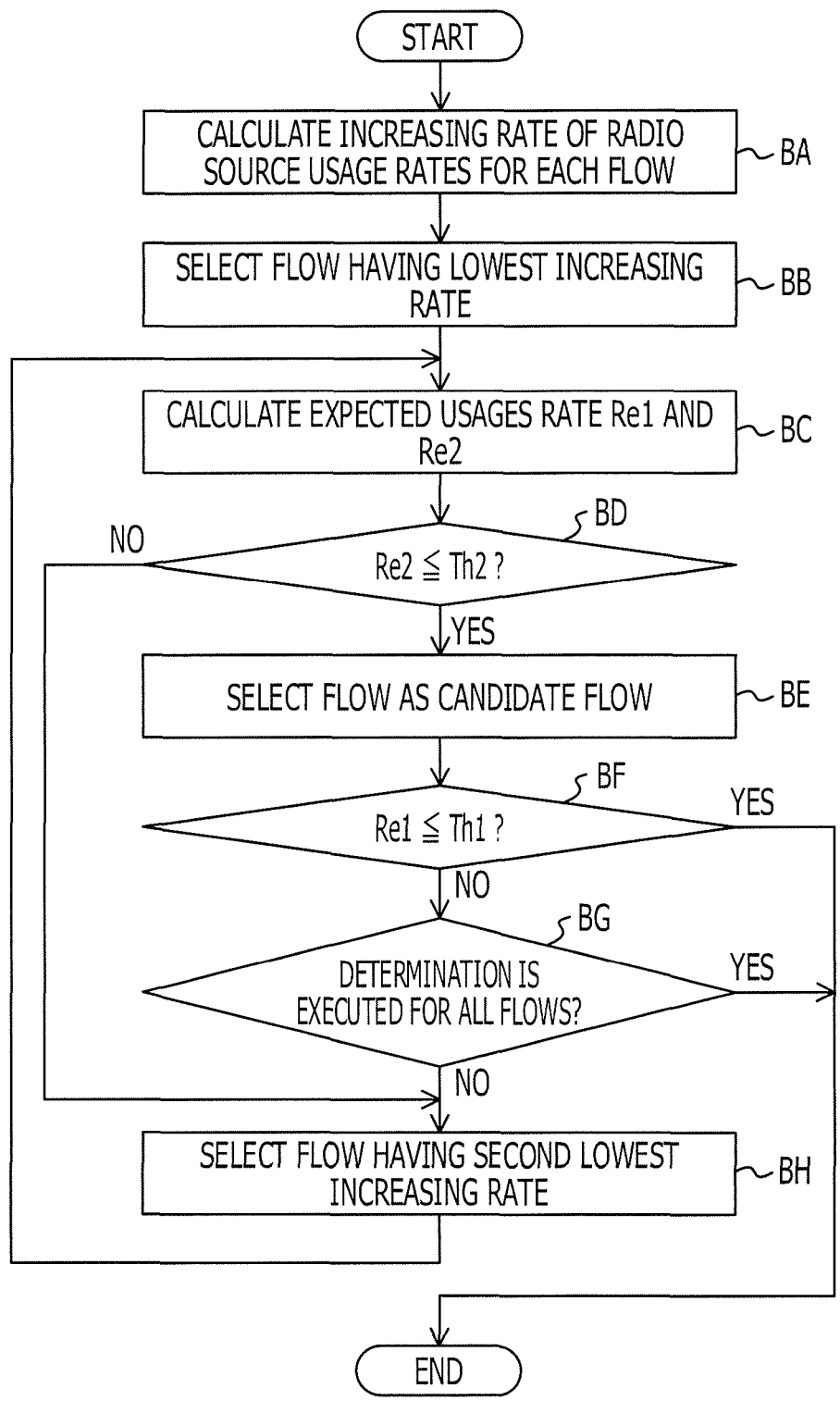
FIG. 9 is a diagram illustrating a first example of a process for extracting a candidate flow.

FIG. 9 is a diagram illustrating a first example of the process for extracting a candidate flow. In Operation BA, the selection unit 32 calculates, for each flow that uses the radio link 5a, an increase rate of a usage rate of a radio resource, which is used for the radio link 5b to a usage rate of a radio resource that is used for the radio link 5a. In Operation BB, the selection unit 32 selects a flow having the lowest increase rate. The selected flow may be referred to as a "target flow" in the description of FIG. 9.

In Operation BC, the selection unit 32 calculates radio resource usage rates in the radio link 5a and the radio link 5b after the used link of the target flow is switched from the radio link 5a to the radio link 5b. In the description of FIG. 9, the radio resource usage rates in the radio link 5a and the radio link 5b after the switching may be respectively referred to as an "expected usage rate Re1" and an "expected usage rate Re2".

In Operation BD, the selection unit 32 determines whether or not the expected usage rate Re2 of the radio link 5b after the switching is a certain threshold value Th2 or less. When the expected usage rate Re2 is the certain threshold value Th2 or less (Operation BD: Yes), the process proceeds to Operation BE. When the expected usage rate Re2 is higher than the certain threshold value Th2 (Operation BD: No), the process proceeds to Operation BH.

In Operation BE, the selection unit 32 selects the target flow as the candidate flow. In Operation BF, the selection unit 32 determines whether or not the congestion of the radio link 5a is freed up by switching the used link of the target flow. That is, the selection unit 32 determines whether or not the expected usage rate Re1 of the radio link 5a after the switching is the predetermined threshold value Th1 or less. When the congestion is freed up (Operation BF: Yes), the process ends. When the congestion is not freed up (Operation BF: No), the process proceeds to Operation BG.

In Operation BG, the selection unit 32 determines whether or not the determination in Operations BC to BF is executed for all of the flows that use the radio link 5a. When the determination is executed for all of the flows (Operation BG: Yes), the process end. When there is a flow for which the determination is not executed (Operation BG: No), the process proceeds Operation BH. In Operation BH, the selection unit 32 selects a flow having the second lowest increase rate, which is the nearest to the target flow as a new target flow, the process returns to Operation BC.

A process for extracting a flow using multiple links by the selection unit 32 is described below. In the process for extracting a flow using multiple links, the selection unit 32 selects one of flows that use the radio link 5a other than a candidate flow. Hereinafter, the selected flow may be referred to as a "target flow" in the description of the process for extracting a flow using multiple links according to the first embodiment. The selection unit 32 defines a link-use ratio at which the target flow is set to use the radio links 5a and 5b at the same time. As long as the congestion does not occur in the radio links 5a and 5b when the radio links 5a and 5b are used at the determined link-use ratio, the selection unit 32 selects the target flow as a multiple link usage flow.

Figure 10:
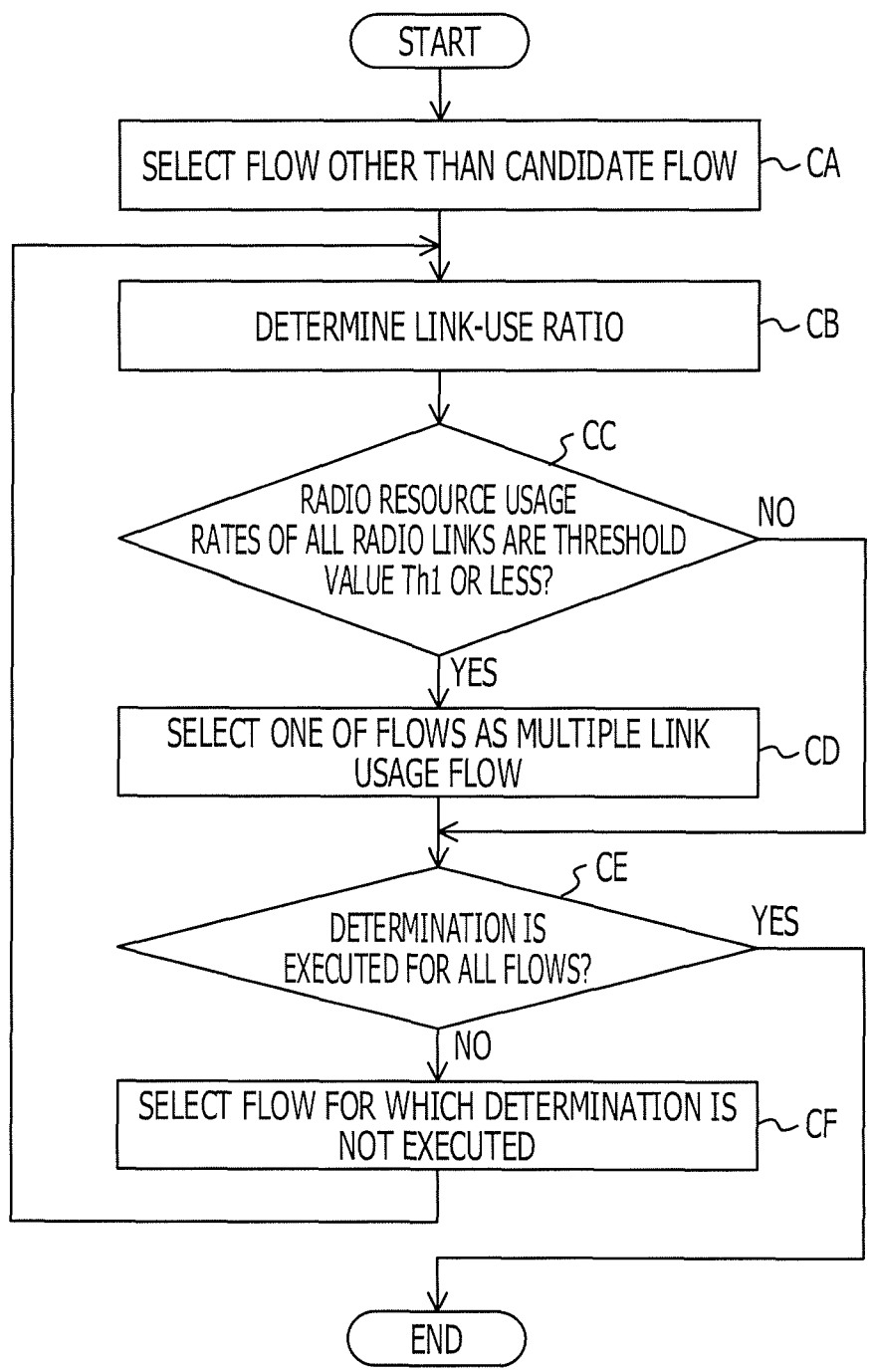
FIG. 10 is a diagram illustrating a first example of a process for extracting a flow that includes multiple links.

FIG. 10 is a diagram illustrating a first example of the process for extracting a flow using multiple links. In Operation CA, the selection unit 32 selects a target flow, which may comprise a flow other than the candidate flow that uses the radio link 5a. The selection unit 32 may select, as the target flow, a flow having the lowest increase from a usage rate of a radio resource that is used for the radio link 5b to a usage rate of a radio resource that is used for the radio link 5a In Operation CB, the selection unit 32 determines a link-use ratio. The selection unit 32 may determine the link-use ratio so that the radio resource usage rates of the radio links becomes equal. In this case, the radio resource usage rates of the radio links 5a and 5b are respectively represented as "X" and "Y", and usage rates of radio resources in the radio links 5a and 5b, which are used for all pieces of traffic of the target flow are respectively represented as "RX" and "RY". When the radio links 5a and 5b are used at the same time, a ratio "x" of a usage amount of the radio link 5a to the whole usage amounts of the radio resources is obtained using the following equation (1).

$$X - [RX^*(1-x)] = Y + [RY^*(1-x)] \quad (1)$$

For example, when "X=90%", "Y=60%", "RX=15%", and "RY=30%" are satisfied, "x=⅓" is obtained. The link-use ratio of the radio link 5a to the radio link 5b is "1:2".

In another embodiment, the selection unit 32 may define a reduction amount of a usage rate of a radio resource, which the target flow uses for the radio link 5a so that the congestion of the radio link 5a is freed up, and determine the link-use ratio so that the reduced portion of the radio resource is used for the radio link 5b. At that time, when a threshold value of the congestion determination is represented as "Th1", the reduction amount is (X−Th1), and a radio resource usage rate of the target flow in the radio link 5a is RX−(X−Th1). On the other hand, a radio resource usage rate of the target flow in the radio link 5b is (X−Th1)× r. Here, "r" is a ratio of a transmission rate in the radio link 5a to a transmission rate in the radio link 5b.

For example, it is assumed that "X=90%", "RX=15%", and "RY=30%" are satisfied, and the threshold value Th1 of the congestion determination is 85%. The radio resource usage rates at which an identical flow uses the radio links 5a and 5b are 15% and 30%, respectively, so that the ratio "r" of the transmission rates is "2". The reduced amount of the target flow is 5%, the radio resource usage rate of the target flow in the radio link 5a is 10%, and the radio resource usage rate of the target flow in the radio link 5b is 10%. The transmission rate in the radio link 5a is twice the transmission rate in the radio link 5b, so that the link-use ratio at which the target flow uses the radio links 5a and 5b is "2:1".

In Operation CC, when the target flow uses the radio links 5a and 5b at the same time at the link-use ratio that is determined in Operation CB, the selection unit 32 determines whether or not the congestion occurs in the radio links 5a and 5b. That is, the selection unit 32 determines whether or not the radio resource usage rates of the radio links 5a and 5b are the threshold value Th1 or less.

For example, it is assumed that "X=90%", "Y=60%", "RX=15%", "RY=30%", and "Th1=85%" are satisfied, and the link-use ratio is "1:2". At that time, the radio resource usage rate of the radio link 5a when the target flow uses the radio links 5a and 5b at the same time is "(90−(15)×⅓)=85%". In addition, the radio resource usage rate of the radio link 5b is "(60+(30)×⅔)=80%". The radio resource usage rates 80% of the radio links 5a and 5b are "Th1=85%" or less.

When the congestion does not occur (Operation CC: Yes), the process proceeds to Operation CD. When the congestion occurs (Operation CC: No), the process proceeds to Operation CE.

In Operation CD, the selection unit 32 selects the target flow as a multiple link usage flow. After that, the process proceeds to Operation CE. In Operation CE, the selection unit 32 determines whether or not the determination of Operations CB to CD is executed for all of the flows that use the radio link 5a other than a candidate flow. When the determination is executed for all of the flows (Operation CE: Yes), the process ends. When there is left a flow for which the determination is not executed (Operation CE: No), the process proceeds to Operation CF.

In Operation CF, the selection unit 32 selects the flow for which the determination is not executed as a new target flow. The selection unit 32 may regard a flow having the second lowest increase rate, which is the nearest to the target flow as a new target flow. After that, the process returns to Operation CB.

1. 5. Effect of the Embodiment

In the embodiment, a throughput of a radio link for input traffic is improved by switching the used link of each flow based on a transmission rate of the radio link and a throughput of the flow.

Each transmission rate of the plurality of radio links 5 may be different between the mobile stations 3. For example, when the radio link 5 uses Wi-Fi, a transmission rate in the mobile station 3 near another neighboring access point is reduced by interference. In addition, when the base station 2 is a femto base station, a transmission rate in the mobile station 3 that is located at a place at which waves arrived from a macrocell base station is reduced by interference. In the first embodiment, the radio link 5 may be allocated to each of the mobile stations 3 so that the radio link 5 having a high transmission rate is used for the mobile station 3.

In the embodiment, the plurality of radio links 5 are used for one flow at the same time, so that a phenomenon may be avoided in which a throughput of the flow reaches the peak due to an upper limit of a throughput of each of the radio links 5.

2. Second Embodiment

Next, the base station 2 according to another embodiment is described. In the first embodiment, the switching process in the case in which the base station 2 uses the two radio links 5 is described. In a second embodiment, a case in which the base station 2 uses the three or more radio links. Process, in which the base station 2 uses the four or more radio links 4, is similar to the process in which the base station 2 uses the three or more radio links. In the following description, it is assumed that the base station 2 uses the radio links 5a, 5b, and 5c, the congestion occurs in the radio link 5a, and the congestion does not occur in the radio links 5b and 5c. The radio links 5b and 5c may be referred to as a "non-congested link".

When the candidate flow is extracted, the selection unit 32 identifies a flow that transmits traffic through the radio link 5a. The selection unit 32 calculates an increase rate of a usage rate of a radio resource that is used by the identified flow in each of the non-congested links 5b and 5c to a usage rate of a radio resource that is used by the identified flow in the radio link 5a, for each of the corresponding combinations of the flow and the non-congested links 5b and 5c. At this time, the selection unit 32 preferentially switches the used link of the flow, for the combination of the flow and the non-congested link, having the lowest increase rate.

Figure 11:
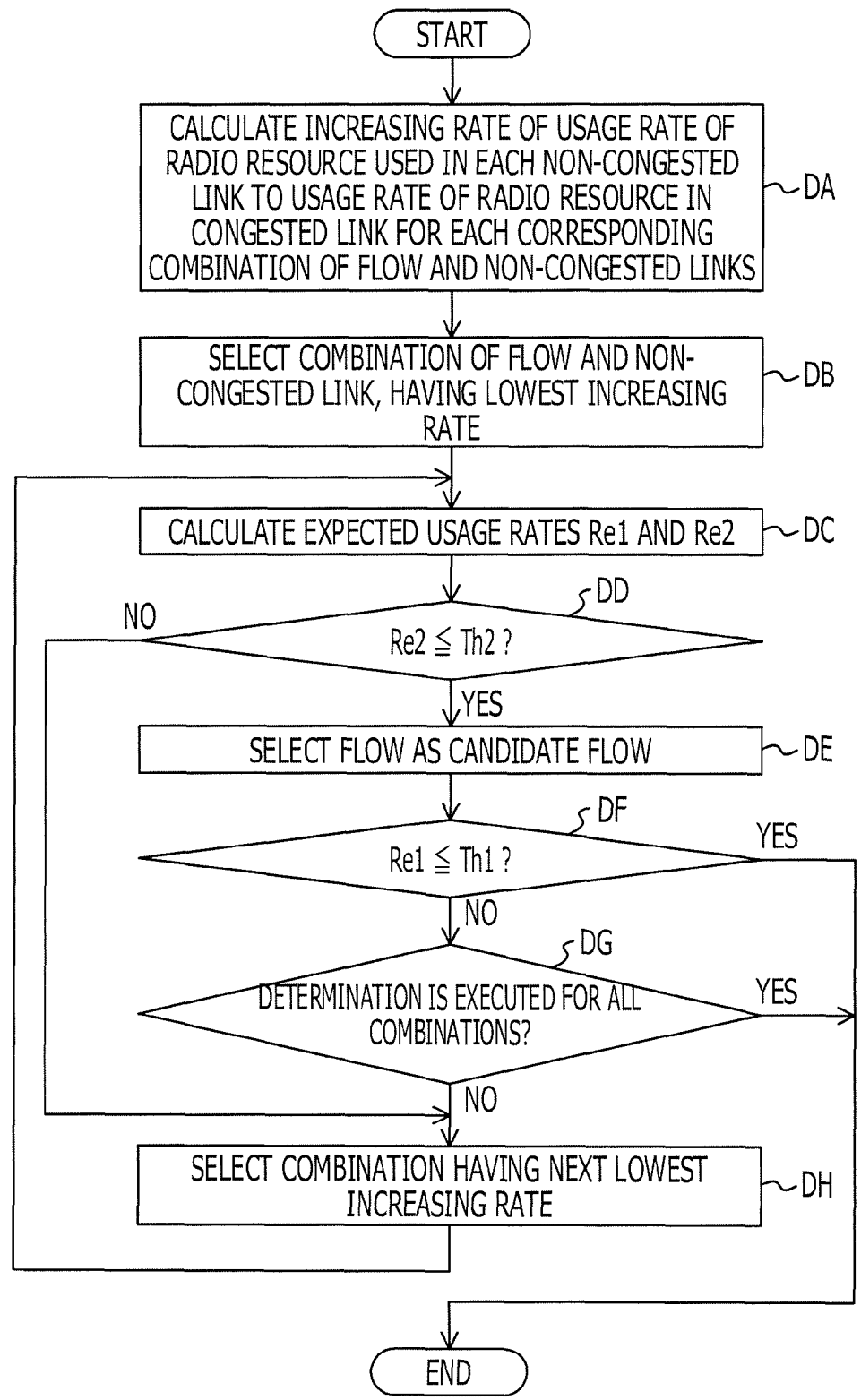
FIG. 11 is a diagram illustrating a second example of the process for extracting a candidate flow.

FIG. 11 is a diagram illustrating a second example of the process for extracting a candidate flow. In Operation DA, the selection unit 32 identifies a flow that uses the radio link 5a. The selection unit 32 calculates an increase rate of a usage rate of a radio resource that is used by the identified flow in each of the non-congested links 5b and 5c to a usage rate of a radio resource that is used by the identified flow in the radio link 5a, for each of the corresponding combinations of the flow and the non-congested links 5b and 5c. In Operation DB, the selection unit 32 selects the combination of the flow and the non-congested link, having the lowest increase rate. In the description of FIG. 11, the flow and the non-congested link of the selected combination may be respectively referred to as a "target flow" and a "target link".

In Operation DC, radio resource usage rates in the radio link 5a and target link are calculated after the used link of the target flow is switched from the radio link 5a to the target link. In the description of FIG. 11, the radio resource usage rates in the radio link 5a and the target link after the switching may be respectively referred to as an "expected usage rate Re1" and an "expected usage rate Re2".

In Operation DD, the selection unit 32 determines whether or not the expected usage rate Re2 of the target link after the switching is a certain threshold value Th2 or less. When the expected usage rate Re2 is the certain threshold value Th2 or less (Operation DD: Yes), the process proceeds to Operation DE. When the expected usage rate Re2 is higher than the certain threshold value Th2 (Operation DD: No), the process proceeds to Operation DH.

In Operation DE, the selection unit 32 selects the target flow as the candidate flow. In addition, the target link is set as the used link of the target flow after the switching. In Operation DF, the selection unit 32 determines whether or not the congestion in the radio link 5a is freed up by switching the used link of the target flow. That is, the selection unit 32 determines whether or not the expected usage rate Ref of the radio link 5a after the switching is the certain the threshold value Thi or less. When the congestion is freed up (Operation DF: Yes), the process end. When the congestion is not freed up (Operation DF: No), the process proceeds to Operation DG.

In Operation DG, the selection unit 32 determines whether or not the determination of Operations DC to DF is executed for all of the combinations of the flow and the non-congested links. When the determination is executed for all of the combinations (Operation DG: Yes), the process ends. When there is left a combination for which the determination is not executed (Operation DG: No), the process proceeds to Operation DH. In Operation DH, the selection unit 32 selects a combination having the second lowest increase rate, which is the nearest to the combination of the target flow and the target link, and returns the process to Operation DC.

A process for extracting a flow using multiple links when the three or more radio links are used is described below. Similarly to the description of FIG. 11, it is assumed that the congestion occurs in the radio link 5a, and the congestion does not occur in the radio links 5b and 5c. There are the following three cases in which links are used at the same time when there are a plurality of non-congested links.

(1) A case in which the radio link 5a and one non-congested link are used at the same time (2) A case in which the plurality of non-congested links are used at the same time (3) A case in which the radio link 5a and the plurality of non-congested link are used at the same time Each of the cases is described below.

2. 1. A Case in which the Radio Link 5a and One Non-Congested Link are Used at the Same Time When a multiple link usage flow is extracted, the selection unit 32 identifies a flow that uses the radio link 5a other than a candidate flow. The selection unit 32 calculates an increase rate of a usage rate of a radio resource that is used by the identified flow in each of the non-congested links 5b and 5c to a usage rate of a radio resource that is used by the identified flow in the radio link 5a, for each of the corresponding combinations of the flow and the non-congested links 5b and 5c. At this time, the selection unit 32 preferentially sets the flow of the combination having a low increase rate as a multiple link usage flow.

For example, it is assumed that radio resource usage rates of the radio link 5a and the non-congested links 5b and 5c are 100%, 65%, and 65%, respectively, and the threshold value Th1 for the congestion determination is 85%. In addition, it is assumed that there are a first flow and a second flow that use the radio link 5a other than a candidate flow, and radio resource usage rates of the first flow in the radio link 5a and the non-congested links 5b and 5c are 15%, 30%, and 50%, respectively. In addition, radio resource usage rates of the second flow in the radio link 5a and the non-congested links 5b and 5c are 10%, 50%, and 40%, respectively.

In this case, an increase rate of a combination of the first flow and the non-congested link 5b is "30/15=2", and an increase rate of a combination of the first flow and the non-congested link 5c is "50/15=10/3". An increase rate of a combination of the second flow and the non-congested link 5b is "50/10=5", and an increase rate of a combination of the second flow and the non-congested link 5c is "40/10=4". Therefore, the combination of the first flow and the non-congested link 5b, the combination of the first flow and the non-congested link 5c, the combination of the second flow and the non-congested link 5c, and the combination of the second flow and the non-congested link 5b are set as a multiple link usage flow in this ascending order of the increase rates.

The selection unit 32 determines a link-use ratio of the radio link 5a and the non-congested link 5b in the first flow. The determination method of a link-use ratio may be similar to that of the first embodiment. In addition, for example, the link-use ratio may be determined so that a radio resource usage rate of the non-congested link 5b is the threshold value Th1 for congestion determination. In this case, the link-use ratio is 1:2, and radio resource usage rates of the radio link 5a and the non-congested link 5b are 90% and 85%, respectively when the first flow uses the radio link 5a and the non-congested link 5b at the same time.

Next, the selection unit 32 sets the second flow as a multiple link usage flow. When the link-use ratio is determined so that a radio resource usage rate of the non-congested link 5c is the threshold value Th1 for congestion determination, the link-use ratio is 1:1. Both of radio resource usage rates of the radio link 5a and the non-congested link 5c when the first flow uses the radio link 5a and the non-congested link 5c at the same time are 85%.

In FIG. 12, a second example of the process for extracting a flow using multiple links is described. In Operation EA, the selection unit 32 identifies a flow that uses the radio link 5a other than a candidate flow. The selection unit 32 calculates an increase rate of a usage rate of a radio resource that is used by the identified flow in each of the non-congested links 5b and 5c to a usage rate of a radio resource that is used by the identified flow in the radio link 5a, for each of the corresponding combinations of the flow and the non-congested links 5b and 5c. In Operation EB, the selection unit 32 selects the combination of the flow and the non-congested link, having the lowest increase rate. In the description of FIG. 12, the flow and the non-congested link of the selected combination may be respectively referred to as a "target flow" and a "target link".

In Operation EC, the selection unit 32 determines a link-use ratio. In Operation ED, the selection unit 32 determines whether or not the congestion occurs in the radio link 5a and the target link when the target flow uses the radio link 5a and the target link at the same time as the link-use ratio that is determined in Operation EC. That is, the selection unit 32 determines whether or not radio resource usage rates of the radio link 5a and the target links are the threshold value Th1 or less. When the congestion does not occur (Operation ED: Yes), the process proceeds to Operation EE. When the congestion occurs (Operation ED: No), the process proceeds to Operation EF.

In Operation EE, the selection unit 32 selects the target flow as a multiple link usage flow. In addition, a non-congested link that is used with the radio link 5a at the same time is determined. After that, the process proceeds to Operation EF. In Operation EF, the selection unit 32 determines whether or not the determination in Operations EC to EE is executed for all of the combinations of the flow and the non-congested links. When the determination is executed for all of the combinations (Operation EF: Yes), the process ends. When there is left a combination for which the determination is not executed (Operation EF: No), the process proceeds to Operation EG. In Operation EG, the selection unit 32 selects a combination having the second lowest increase rate, which is nearest to the combination of the target flow and the target link, and returns the process to Operation EC.

2. 2. A Case in which a Plurality of Non-Congested Links are Used at the Same Time The selection unit 32 identifies a flow that uses the radio link 5a other than a candidate flow. The selection unit 32 calculates an increase rate of a usage rate of a radio resource that is used by the identified flow in each of the non-congested links 5b and 5c to a usage rate of a radio resource that is used by the identified flow in the radio link 5a, for each of the corresponding combinations of the flow and the non-congested links 5b and 5c.

The selection unit 32 selects the flow of the combination having a low increase rate in ascending order. In addition, the selection unit 32 selects a non-congested link included in the combination having the lowest increase rate, out of combinations including the selected flow. The selection unit 32 determines a multiple link usage flow and a link-use ratio by virtually assuming that the selected non-congested link is used instead of the radio link 5a and executing a process similar to that in Operations EC to EG.

2. 3. A Case in which the Radio Link 5a and the Plurality of Non-Congested Links are Used at the Same Time The selection unit 32 identifies a flow that uses the radio link 5a other than a candidate flow. The selection unit 32 calculates an increase rate of a usage rate of a radio resource that is used by the identified flow in each of the non-congested links 5b and 5c to a usage rate of a radio resource that is used by the identified flow in the radio link 5a, for each of the corresponding combinations of the flow and the non-congested links 5b and 5c.

The selection unit 32 selects the flow of the combination having a low increase rate in ascending order. The selection unit 32 determines a link-use ratio at which the selected flow uses the radio link 5a and a plurality of non-congested links. For example, the selection unit 32 may determines the link-use ratio that radio resource usage rates of the radio link 5a and the plurality of non-congested links are equal.

In addition, according to another embodiment, the selection unit 32 defines a reduction amount of a radio resource usage rate at which the selected flow uses the radio link 5a so that the congestion of the radio link 5a is freed up. When the reduced portion of the radio resource is used for any one of the non-congested links, the selection unit 32 determines whether or not the congestion occurs in the non-congested link. When the congestion occurs, the selection unit 32 defines a reduction amount of a radio resource usage rate at which the selected flow uses the non-congested link so that the congestion is freed up. The selection unit 32 determines whether or not the congestion occurs when the reduced portion of the radio resource is used for another non-congested link. When the above-described processes are repeated and the congestion does not occur in any one of the radio links 5, the selection unit 32 determines a link-use ratio based on the radio resource usage rates at which the selected flow uses the radio link 5a and the plurality of non-congested links.

Next, the selection unit 32 determines a multiple link usage flow and a link-use ratio by executing a process that is similar to that in Operations ED to EG for the selected flow with reference to FIG. 12.

In the embodiment, the used link of each flow may be switched based on transmission rates of radio links and a throughput of the flow even when the base station 2 uses the three or more radio links 5. A throughput of a radio link for input traffic may be further improved by increasing choices of the used link after the switching.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising:
   a first radio interface configured to communicate with each of terminals via a first radio link using a first radio resource and a first radio access technology;
   a second radio interface configured to communicate with each of the terminals via a second radio link using a second radio resource and a second radio access technology; and
   a processor configured to:
   monitor the first radio link and the second radio link for detecting a first congestion in the first radio link and a second congestion in the second radio link,
   estimate each first transmission rate of the first radio link for each of the terminals and each second transmission rate of the second radio link for each of the terminals,
   measure a throughput of each communication flow that is transmitted via at least one of the first radio link and the second radio link,
   estimate each associated ratio of a second value to a first value for each communication flow, the first value being a first ratio of each throughput to each first transmission rate, the second value being a second ratio of each throughput to each second transmission rate,
   when the first congestion is detected, preferentially select at least one communication flow that is a lowest in the estimated associated ratios from the communication flows, and
   transfer the at least one communication flow from the first link using the first radio access technology to the second link using the second radio access technology.

2. The base station device according to the claim 1, wherein the processor is further configured to:
   select a communication flow which is transmitted via the first radio link and the second radio link, among communication flows transmitted via the first radio link or the second radio link, based on each throughput of each of the communication flows, each first transmission rate, and each second transmission rate, and
   distribute the selected communication flow to the first radio link using the first radio access technology and the second radio link using the second radio access technology.

3. The base station device according to the claim 1, wherein the processor preferentially selects the at least one specified terminal further when the second congestion is not detected.

4. The base station device according to the claim 1, wherein the processor is further configured to:
   determine whether the first congestion is to be freed up due to transferring of the at least one communication flow,
   when determining whether the first congestion is to continue, select a communication flow to be transmitted via the first radio link and the second radio link, among communication flows transmitted via one of the first radio link and the second radio link, based on each throughput of each of the communication flows, each first transmission rate, and each second transmission rate, and
   distribute the selected communication flow to the first radio link using the first radio access technology and the second radio link using the second radio access technology.

5. The base station device according to the claim 2, wherein the processor is further configured to preferentially select the communication flow that has an associated ratio of a usage rate of a radio resource in the second radio link to a usage rate of a radio resource in the first radio link that is a lowest of such ratios associated with the communication flows.

6. The base station device according to the claim 2, wherein the processor is further configured to distribute the communication flows to make usage rates of the first radio link and the second radio link approximately equal.

7. The base station device according to the claim 2, wherein the processor is further configured to distribute the communication flows to avoid the first congestion and the second congestion.

8. A radio resource allocation method performed by a base station device, the radio resource allocation method comprising:
   communicating with each of terminals using a first radio link and a first radio access technology;
   communicating with each of the terminals using a second radio link and a second radio access technology;
   monitoring the first radio link and the second radio link for detecting a first congestion on the first radio link and a second congestion on the second radio link;
   estimating each first transmission rate of the first radio link for each of the terminals and each second transmission rate of the second radio link for each of the terminals,
   measuring a throughput of each communication flow that is transmitted via at least one of the first radio link and the second radio link,
   estimating each associated ratio of a second value to a first value for each communication flow, the first value being a first ratio of each throughput to each first transmission rate, the second value being a second ratio of each throughput to each second transmission rate,
   when the first congestion is detected, to preferentially select at least one communication flow that is a lowest in the estimated associated ratios from the communication flows, and
   transferring the at least one communication flow from the first link using the first radio access technology to the second link using the second radio access technology.

9. The radio resource allocation method according to the claim 8, further comprising preferentially selecting as the at least one specified terminal a terminal that has an associated ratio of a usage rate of a radio resource in the second radio link to a usage rate of a radio resource in the first radio link is lowest.

10. The radio resource allocation method according to the claim 8, further comprising:
    selecting a communication flow which is transmitted via the first radio link and the second radio link, among communication flows transmitted via the first radio link or the second radio link, based on each of throughput, the first channel quality, and the second channel quality; and
    distributing the selected communication flow to the first radio link and the second radio link.

11. The radio resource allocation method according to the claim 8, further comprising preferentially selecting the at least one specified terminal further when the second congestion is not detected.

12. The radio resource allocation method according to the claim 8, further comprising preferentially selecting the at least one specified terminal, even though the first channel quality is better than the second channel quality.

13. The radio resource allocation method according to the claim 10, further comprising preferentially selecting the communication flow that has an associated ratio of a usage rate of a radio resource in the second radio link to a usage rate of a radio resource in the first radio link that is lowest of such ratios associated with the communication flows.

14. The radio resource allocation method according to the claim 10, wherein the distributing distributes the communication flows to make usage rates of the first radio link and the second radio link are approximately equal.

15. The radio resource allocation method according to the claim 10, wherein the distributing distributes the communication flows to avoid the first congestion and the second congestion.

* * * * *